US012619789B2

(12) United States Patent
Kwok et al.

(10) Patent No.: US 12,619,789 B2
(45) Date of Patent: May 5, 2026

(54) AUTOMATICALLY FINGERPRINTING OF CLOUD DOCUMENTS

(71) Applicant: Cisco Technology, Inc., San Jose, CA (US)

(72) Inventors: Pak Ho Philip Kwok, London (GB); Ahmed Hassan, London (GB); Jack Davey, Beckenham (GB); Roman Sosnin, Petach Tikva (IL); Smitha Sushil, Shirley (GB)

(73) Assignee: Cisco Technology, Inc., San Jose, CA (US)

( * ) Notice: Subject to any disclaimer, the term of this patent is extended or adjusted under 35 U.S.C. 154(b) by 126 days.

(21) Appl. No.: 18/531,994

(22) Filed: Dec. 7, 2023

(65) Prior Publication Data

US 2025/0190627 A1 Jun. 12, 2025

(51) Int. Cl.
*G06F 21/64* (2013.01)

(52) U.S. Cl.
CPC .................................... *G06F 21/64* (2013.01)

(58) Field of Classification Search
CPC ....................................................... G06F 21/64
See application file for complete search history.

(56) References Cited

U.S. PATENT DOCUMENTS 9,998,470 B1 * 6/2018 Hockings .............. G06F 21/556
11,201,728 B1 * 12/2021 Bouchard ............. H04L 9/0637

| 2014/0101113 A1 * | 4/2014 | Zhang | H04L 67/5681 |
| | | | 707/E17.002 |
| 2015/0074759 A1 * | 3/2015 | Shanklin | G06F 21/566 |
| | | | 726/3 |
| 2018/0048658 A1 * | 2/2018 | Hittel | H04L 63/1433 |
| 2018/0234234 A1 * | 8/2018 | Hurley | G06F 21/64 |
| 2019/0034289 A1 | 1/2019 | Natanzon et al. | |
| 2020/0349016 A1 | 11/2020 | Chang et al. | |
| 2021/0058374 A1 * | 2/2021 | Smith | H04L 63/0414 |
| 2021/0109814 A1 * | 4/2021 | Dewey | G06F 3/067 |
| 2021/0243233 A1 * | 8/2021 | Singh | H04L 63/0435 |
| 2022/0129426 A1 * | 4/2022 | Sohail | G06F 16/215 |
| 2023/0163955 A1 * | 5/2023 | Niihara | H04L 9/0891 |
| | | | 713/171 |
| 2024/0085566 A1 * | 3/2024 | Mobarak | G01S 19/073 |

* cited by examiner

*Primary Examiner* — Andrew Suh

(74) *Attorney, Agent, or Firm* — Polsinelli P.C.

(57) ABSTRACT

Method, system, and/or computer readable medium for automatically selective updating a data fingerprint on a plurality of proxy datacenters, the method comprising: generating through a cloud connector fingerprints of a stored set of data on a cloud drive; transmitting, from the cloud connector the fingerprints to a plurality of proxy datacenters; periodically automatically obtaining, through the cloud connector, a list of updated files stored on the cloud drive; automatically running, on the cloud connector, a fingerprinter on the list of updated files that generates supplemental fingerprints for the updated files; and transmitting, from the cloud connector, the supplemental fingerprints to the plurality of proxy datacenters.

19 Claims, 3 Drawing Sheets

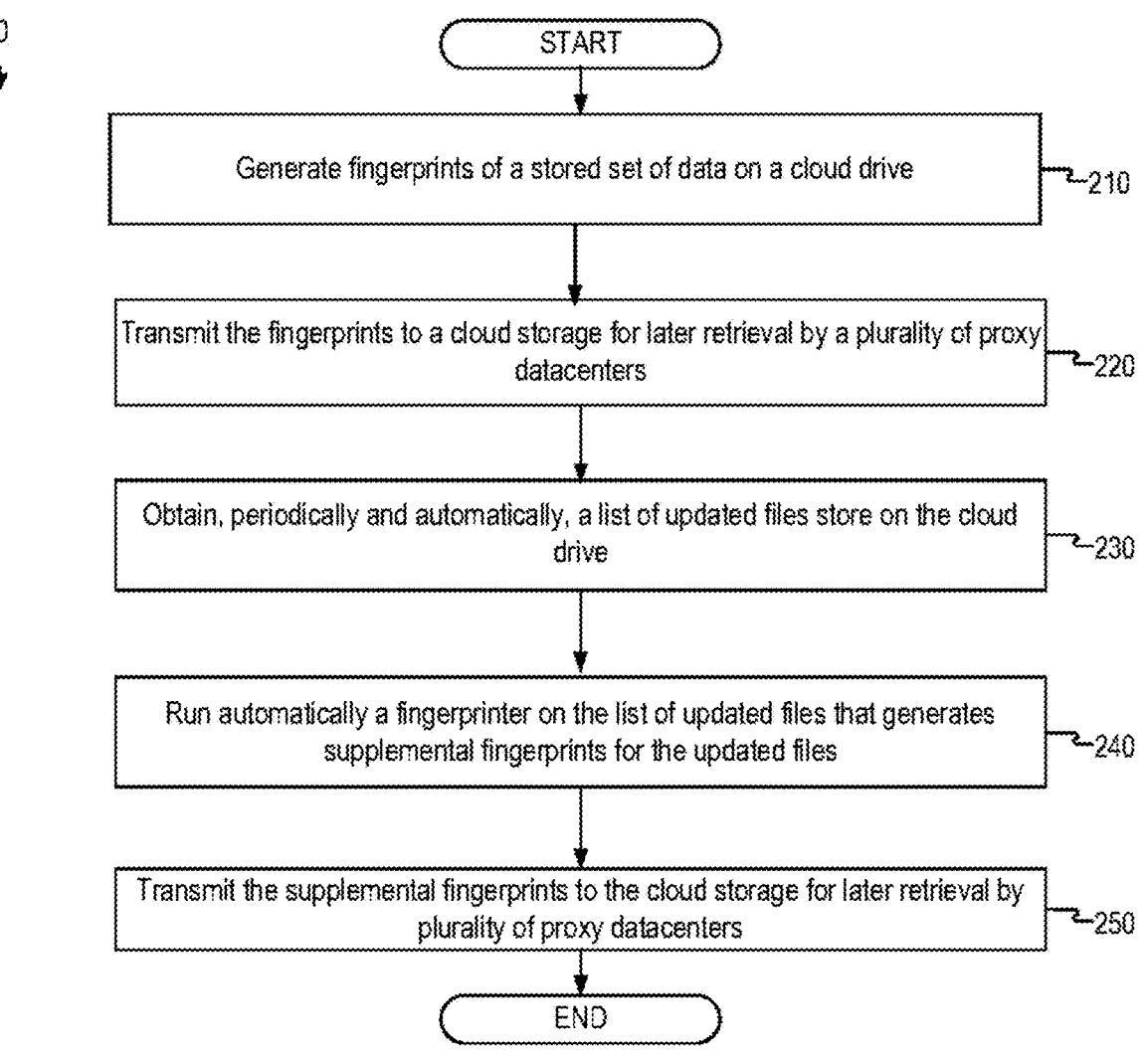

200

START

Generate fingerprints of a stored set of data on a cloud drive — 210

Transmit the fingerprints to a cloud storage for later retrieval by a plurality of proxy datacenters — 220

Obtain, periodically and automatically, a list of updated files store on the cloud drive — 230

Run automatically a fingerprinter on the list of updated files that generates supplemental fingerprints for the updated files — 240

Transmit the supplemental fingerprints to the cloud storage for later retrieval by plurality of proxy datacenters — 250

END

FIG. 2

AUTOMATICALLY FINGERPRINTING OF CLOUD DOCUMENTS

BACKGROUND

Attacks on networks continues to increase. The attack on a network can be an internal network or a cloud based network. Many companies implement a storage solution that involves both cloud-based resources and internal resources. Cloud based resources can be implemented to provide enhanced access from any remote location.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

FIG. 2 illustrates an example of a method according to the present disclosure.

DESCRIPTION

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Systems, methods, and computer-readable media are provided for automatically selective updating a data fingerprint on a plurality of proxy datacenters. An example method can include generating through a cloud connector fingerprints of a stored set of data on a cloud drive. The method can also include transmitting from the cloud connector the fingerprints to a plurality of proxy datacenters. The method can further include periodically automatically obtaining, through the cloud connector, a list of updated files stored on the cloud drive. Still further, the method can include automatically running, on the cloud connector, a fingerprinter on the list of updated files that generates supplemental fingerprints for the updated files. Additionally, the method can include transmitting, from the cloud connector, the supplemental fingerprints to the plurality of proxy datacenters.

An example system can include one or more processors and at least one computer-readable storage medium storing instructions which, when executed by the one or more processors, cause the one or more processors to generate fingerprints of a stored set of data on a cloud drive; transmit the fingerprints to a plurality of proxy datacenters; obtain, periodically and automatically, a list of updated files stored on the cloud drive; running automatically a fingerprinter on the list of updated files that generates supplemental fingerprints for the updated files; and transmitting the supplemental fingerprints to the plurality of proxy datacenters.

An example non-transitory computer-readable storage medium having stored therein instructions which, when executed by a processor, cause the processor to generate fingerprints of a stored set of data on a cloud drive; transmit the fingerprints to a plurality of proxy datacenters; obtain, periodically and automatically, a list of updated files stored on the cloud drive; running automatically a fingerprinter on the list of updated files that generates supplemental fingerprints for the updated files; and transmitting the supplemental fingerprints to the plurality of proxy datacenters.

Figure 1:
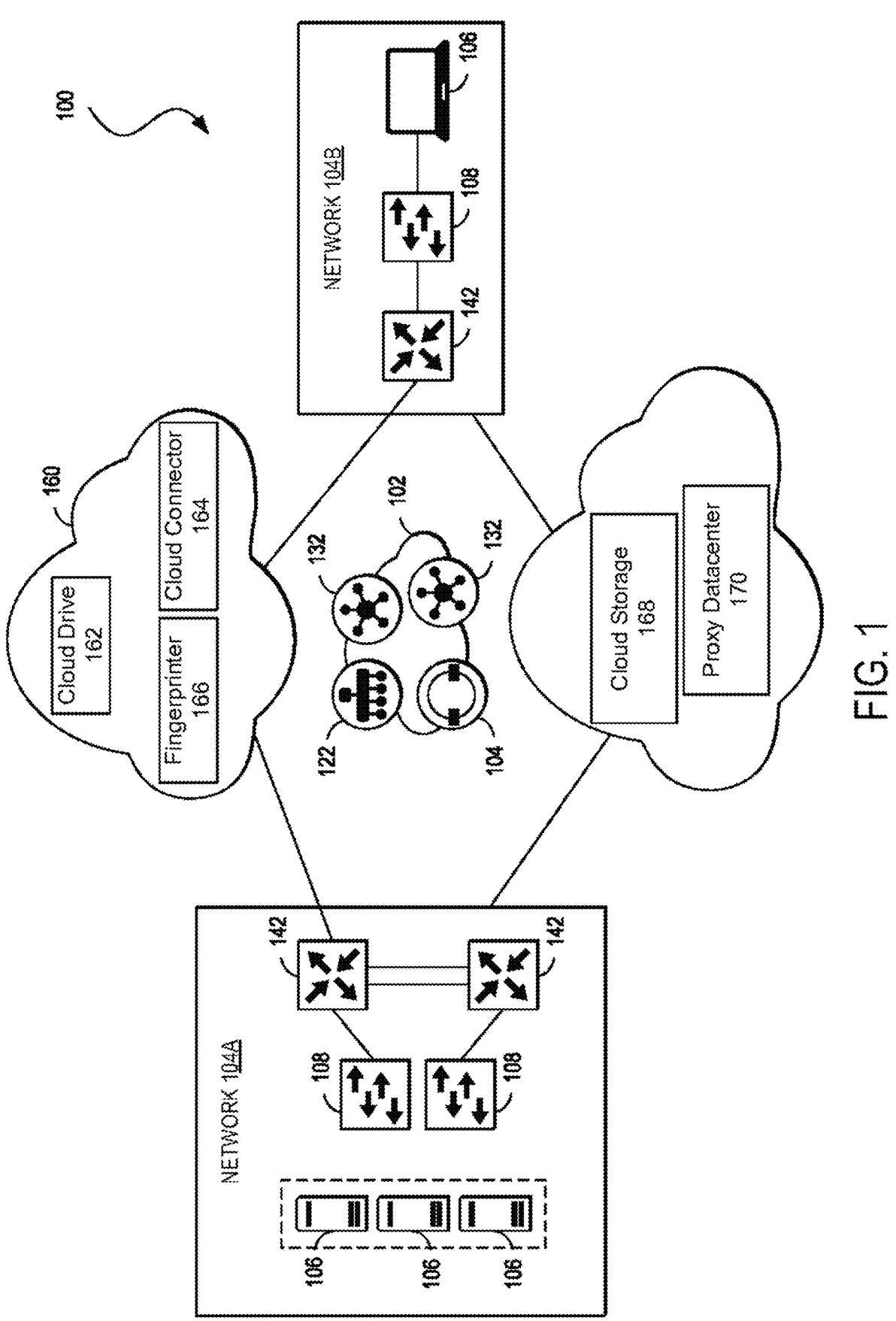
FIG. 1 illustrates an example of a network topology in according to the present disclosure.

FIG. 1 illustrates an example of a network topology 100 for showing various aspects of the network architecture. The network topology 100 can include a management network 102, a pair of network sites 104A and 104B (e.g., the data center(s), the campus network(s), the branch office network(s), the home office network(s), cloud service provider network(s), etc.), and Internet transport network 160. The management network 102 can include one or more network orchestrator appliances 105, one or more network management appliance 122, and one or more network controller appliances 132. Although the management network 102 is shown as a single network in this example, one of ordinary skill in the art will understand that each element of the management network 102 can be distributed across any number of networks and/or be co-located with the pair of network sites 104A, 10B. In this example, each element of the management network 102 can be reached through transport network 160.

Each site can include one or more endpoints 106 connected to one or more site network devices 108. The endpoints 106 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 106 can also include Internet of Things (IoT) devices or equipment, such as agricultural equipment (e.g., livestock tracking and management systems, watering devices, etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

The site network devices 108 can include physical or virtual switches, routers, and other network devices. Although the site 104A is shown including a pair of site network devices and the site 104B is shown including a single site network device in this example, the site network devices 108 can comprise any number of network devices in any network topology, including multi-tier (e.g., core, distribution, and access tiers), spine-and-leaf, mesh, tree, bus, hub and spoke, and so forth. For example, in some embodiments, one or more data center networks may implement the Cisco® Application Centric Infrastructure (ACI) architecture and/or one or more campus networks may implement the Cisco® Software Defined Access (SD-Access or SDA) architecture. The site network devices 108 can connect the endpoints 106 to one or more edge network devices 142, and the edge network devices 142 can be used to directly connect to the transport networks 160.

In some embodiments, "color" can be used to identify an individual WAN transport network, and different WAN transport networks may be assigned different colors (e.g., mpls, private1, biz-internet, metro-ethernet, lte, etc.).

In some embodiments, each edge network device 108 can form a Datagram Transport Layer Security (DTLS) or TLS control connection to the network controller appliance(s) 132 and connect to any network control appliance 132 over each transport network 160. In some embodiments, the edge network devices 142 can also securely connect to edge network devices in other sites via IPSec tunnels. In some embodiments, the BFD protocol may be used within each of these tunnels to detect loss, latency, jitter, and path failures.

On the edge network devices 142, color can be used help to identify or distinguish an individual WAN transport tunnel (e.g., no same color may be used twice on a single edge network device). Colors by themselves can also have significance. For example, the colors metro-ethernet, mpls, and private1, private2, private3, private4, private5, and private6 may be considered private colors, which can be used for private networks or in places where there is no NAT addressing of the transport IP endpoints (e.g., because there may be no NAT between two endpoints of the same color). When the edge network devices 142 use a private color, they may attempt to build IPSec tunnels to other edge network devices using native, private, underlay IP addresses. The public colors can include 3 g, biz, internet, blue, bronze, custom1, custom2, custom3, default, gold, green, lte, public-internet, red, and silver. The public colors may be used by the edge network devices 142 to build tunnels to post-NAT IP addresses (if there is NAT involved). If the edge network devices 142 use private colors and need NAT to communicate to other private colors, the carrier setting in the configuration can dictate whether the edge network devices 142 use private or public IP addresses. Using this setting, two private colors can establish a session when one or both are using NAT.

As illustrated, the Internet transport network 160 can include a cloud drive 162, a cloud connector 164, and a fingerprinter 166. The cloud drive 162 can include one or more devices. The cloud drive 162 can represent a general source of data and a place where data is stored. The cloud drive 162 can include one or more separate units that are physically separated but located on a single cloud service. The present technology can be implemented across multiple cloud drives 162 or a single cloud drive 162. In other instances, separate instances of cloud drives 162 can be made available from one or more service providers of cloud drives. The cloud connector 164 provides connection between the cloud drive 162, the network sites 104A, 104B, and/or the fingerprinter 166. The fingerprinter 166 is responsible for generating the fingerprints for files located on the cloud drive 162. The fingerprinter 166 can be located on the cloud or in one of the network sites 104A, 104B.

Additionally, a service provider cloud storage 168 can be included. The service provider cloud storage 168 is a cloud storage device controlled by a service provider that provides internet connectivity to one or more companies through their service. Additionally, a proxy datacenter 170 can be implemented to provide access to the internet and/or other external website. The proxy datacenter 170 replaces or obfuscates an original IP address with another IP address so that the information can be accessed faster with lower latencies.

FIG. 2 illustrates an example process 200 for automatically selective updating a data fingerprint on a plurality of proxy datacenters. Although the example process 200 depicts a particular sequence of operations, the sequence may be altered without departing from the scope of the present disclosure. For example, some of the operations depicted may be performed in parallel or in a different sequence that does not materially affect the function of the process 200. In other examples, different components of an example device or system that implements process 200 may perform functions at substantially the same time or in a specific sequence.

According to some examples, the process 200 includes generating, through a cloud connector, fingerprints of a stored set of data on a cloud drive at block 210. For example, the cloud connector 164 illustrated in FIG. 1 may generate fingerprints of a stored set of data on a cloud drive.

According to some examples, process 200 includes transmitting, from the cloud connector, the fingerprints to a plurality of proxy datacenters at block 220. For example, the cloud connector 164 illustrated in FIG. 1 can transmit the fingerprints to a cloud storage for later retrieval by a plurality of proxy datacenters.

According to some examples, process 200 includes periodically automatically obtaining, through the cloud connector, a list of updated files stored on the cloud drive at block 230. For example, the cloud connector 164 illustrated in FIG. 1 can periodically automatically obtain a list of updated files stored on the cloud drive. In at least one example, the list of updated files includes files that were included on the stored set of data and subsequently modified. In at least one example, the list of updated files includes additional files that were not previously on the stored set of data. In at least one example, the periodically automatically obtaining the list of updated files operates through an application programming interface.

According to some examples, process 200 includes automatically running, on the cloud connector, a fingerprinter on the list of updated files that generates supplemental fingerprints for the updated files at block 240. For example, the cloud connector 164 illustrated in FIG. 1 can automatically run a fingerprinter on the list of updated files that generates supplemental fingerprints for the updated files.

According to some examples, process 200 includes transmitting, from the cloud connector, the supplemental fingerprints to the cloud storage for later retrieval by a plurality of proxy datacenters at block 250. For example, the cloud connector 164 illustrated in FIG. 1 can transmit the supplemental fingerprints to the plurality of proxy datacenters.

Additionally, the process 200 can include instructing the plurality of proxy datacenter to retrieve the fingerprints and the supplemental fingerprints from the cloud storage at predetermined intervals. In at least one example the predetermined intervals can be on the order of one minute. In another example, the predetermined intervals can be less than a minute. In yet another example, the predetermined intervals can be daily or hourly. In other examples, the predetermined intervals can vary. Furthermore, the process 200 can include determining that one or more files on the cloud drive have been deleted and transmitting a request to remove a corresponding fingerprint from the cloud storage and the plurality of proxy datacenters. Additionally, the process 200 can include performing data leak prevention using the fingerprints.

Figure 3:
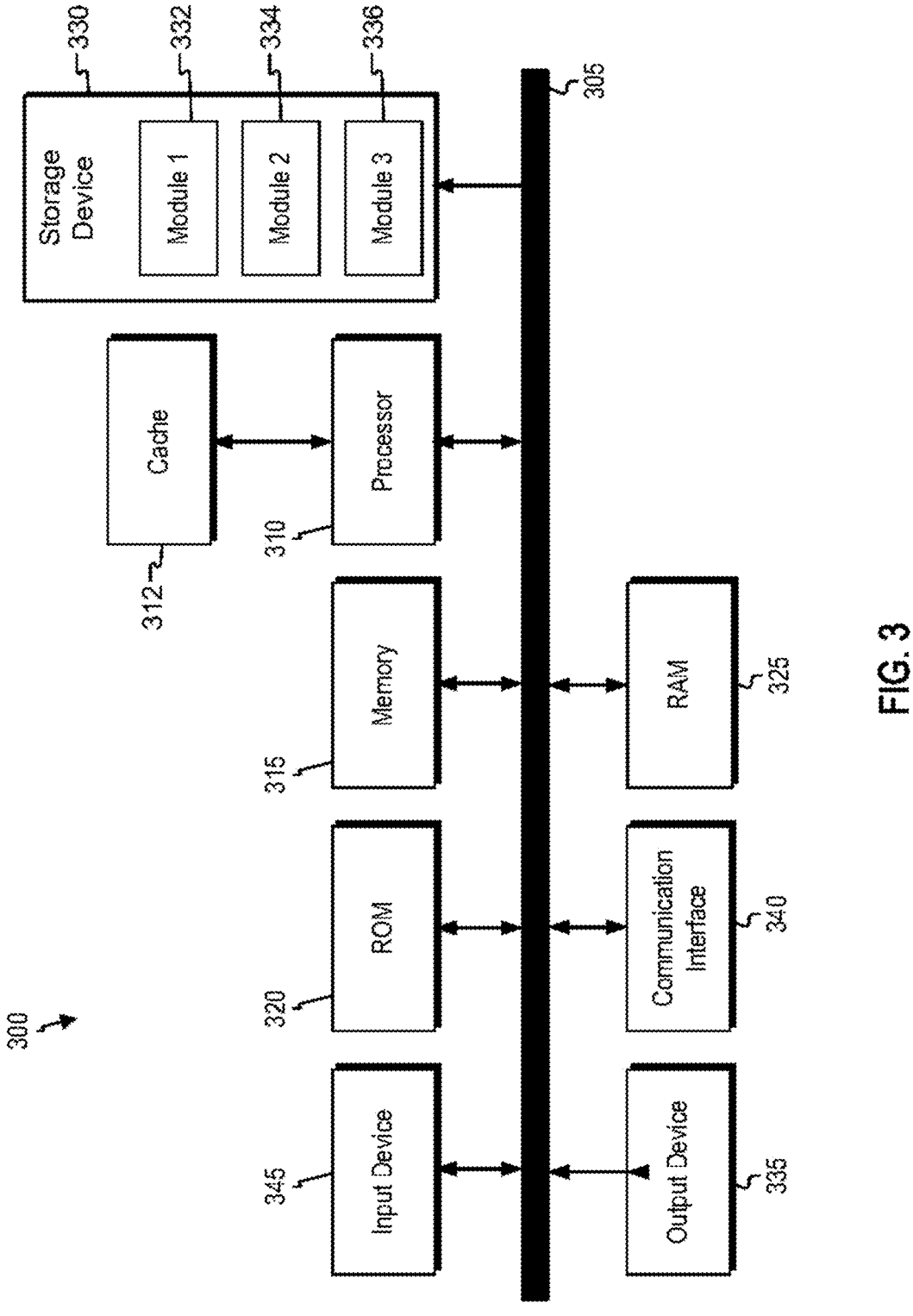
FIG. 3 shows an example of computing system, which can be for example any computing device that can implement components of the system.

FIG. 3 shows an example of computing system 300, which can be for example any computing device making up one or more devices in the network topology of FIG. 1 or any component thereof in which the components of the system are in communication with each other using connection 305. Connection 305 can be a physical connection via a bus, or a direct connection into processor 310, such as in a chipset architecture. Connection 305 can also be a virtual connection, networked connection, or logical connection.

In some embodiments computing system 300 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 300 includes at least one processing unit (CPU or processor) 310 and connection 305 that couples various system components including system memory 315, such as read only memory (ROM) 320 and random access memory (RAM) 325 to processor 310. Computing system 300 can include a cache of high-speed memory 312 connected directly with, in close proximity to, or integrated as part of processor 310.

Processor 310 can include any general purpose processor and a hardware service or software service, such as services 332, 334, and 336 stored in storage device 330, configured to control processor 310 as well as a special-purpose processor where software instructions are incorporated into the actual processor design. Processor 310 may essentially be a completely self-contained computing system, containing multiple cores or processors, a bus, memory controller, cache, etc. A multi-core processor may be symmetric or asymmetric.

To enable user interaction, computing system 300 includes an input device 345, which can represent any number of input mechanisms, such as a microphone for speech, a touch-sensitive screen for gesture or graphical input, keyboard, mouse, motion input, speech, etc. Computing system 300 can also include output device 335, which can be one or more of a number of output mechanisms known to those of skill in the art. In some instances, multimodal systems can enable a user to provide multiple types of input/output to communicate with computing system 300. Computing system 300 can include communications interface 340, which can generally govern and manage the user input and system output. There is no restriction on operating on any hardware arrangement and therefore the basic features here may easily be substituted for improved hardware or firmware arrangements as they are developed.

Storage device 330 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 330 can include software services, servers, services, etc., that when the code that defines such software is executed by the processor 310, it causes the system to perform a function. In some embodiments, a hardware service that performs a particular function can include the software component stored in a computer-readable medium in connection with the necessary hardware components, such as processor 310, connection 305, output device 335, etc., to carry out the function.

For clarity of explanation, in some instances the present technology may be presented as including individual functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Aspect 1. A method of automatically selective updating a data fingerprint on a plurality of proxy datacenters, the method comprising: generating through a cloud connector fingerprints of a stored set of data on a cloud drive; transmitting, from the cloud connector the fingerprints to a cloud storage for later retrieval by a plurality of proxy datacenters; periodically automatically obtaining, through the cloud connector, a list of updated files stored on the cloud drive; automatically running, on the cloud connector, a fingerprinter on the list of updated files that generates supplemental fingerprints for the updated files; transmitting, from the cloud connector, the supplemental fingerprints to the cloud storage for later retrieval by the plurality of proxy datacenters.

Aspect 2. The method of Aspect 1, wherein the list of updated files includes files that were included on the stored set of data and subsequently modified.

Aspect 3. The method of any of Aspects 1 to 2, wherein the list of updated files includes additional files that were not previously on the stored set of data.

Aspect 4. The method of any of Aspects 1 to 3, further comprising: instructing the plurality of proxy datacenters to retrieve the fingerprints and the supplemental fingerprints from the cloud storage at predetermined intervals.

Aspect 5. The method of Aspect 4, further comprising determining that one or more files on the cloud drive have been deleted and transmitting a request to remove a corresponding fingerprint from the cloud storage and the plurality of proxy datacenters.

Aspect 6. The method of any of Aspects 1 to 5, wherein the periodically automatically obtaining the list of updated files operates through an application programming interface.

Aspect 7. The method of any of Aspects 1 to 6, further comprising: performing data leak prevention using the fingerprints.

Aspect 8. A system includes a storage (implemented in circuitry) configured to store instructions and a processor. The processor configured to execute the instructions and cause the processor to: generate fingerprints of a stored set of data on a cloud drive; transmit the fingerprints to a cloud storage for later retrieval by a plurality of proxy datacenters; periodically automatically obtain a list of updated files stored on the cloud drive; automatically run a fingerprinter on the list of updated files that generates supplemental fingerprints for the updated files; transmit the supplemental fingerprints to the cloud storage for later retrieval by the plurality of proxy datacenters.

Aspect 9. The system of Aspect 8, wherein the list of updated files includes files that were included on the stored set of data and subsequently modified.

Aspect 10. The system of any of Aspects 8 to 9, wherein the list of updated files includes additional files that were not previously on the stored set of data.

Aspect 11. The system of any of Aspects 8 to 10, wherein the processor is configured to execute the instructions and cause the processor to: instruct the plurality of proxy datacenters to retrieve the fingerprints and supplemental from the cloud storage at predetermined intervals.

Aspect 12. The system of Aspect 11, wherein the processor is further configured to determine that one or more files on the cloud drive have been deleted and transmit a request to remove a corresponding fingerprint from the cloud storage and the plurality of proxy datacenters.

Aspect 13. The system of any of Aspects 8 to 12, wherein the periodically automatically obtaining the list of updated files operates through an application programming interface.

Aspect 14. The system of any of Aspects 8 to 13, wherein the processor is configured to execute the instructions and cause the processor to: perform data leak prevention using the fingerprints.

Aspect 15. A computer readable medium comprising instructions using a computer system. The computer includes a memory (e.g., implemented in circuitry) and a processor (or multiple processors) coupled to the memory. The processor (or processors) is configured to execute the computer readable medium and cause the processor to: generate fingerprints of a stored set of data on a cloud drive; transmit the fingerprints to a cloud storage for later retrieval by a plurality of proxy datacenters; periodically automatically obtain a list of updated files stored on the cloud drive; automatically run a fingerprinter on the list of updated files that generates supplemental fingerprints for the updated files; transmit the supplemental fingerprints to the cloud storage for later retrieval by to the plurality of proxy datacenters.

Aspect 16. The computer readable medium of Aspect 15, wherein the list of updated files includes files that were included on the stored set of data and subsequently modified.

Aspect 17. The computer readable medium of any of Aspects 15 to 16, wherein the list of updated files includes additional files that were not previously on the stored set of data.

Aspect 18. The computer readable medium of any of Aspects 15 to 17, wherein the processor is configured to execute the computer readable medium and cause the processor to: instruct the plurality of proxy datacenters to retrieve the fingerprints and the supplemental fingerprints from the cloud storage at predetermined intervals.

Aspect 19. The computer readable medium of Aspect 18, wherein the processor is further configured to determine that one or more files on the cloud drive have been deleted and transmit a request to remove a corresponding fingerprint from the cloud storage and the plurality of proxy datacenters.

Aspect 20. The computer readable medium of any of Aspects 15 to 19, wherein the periodically automatically obtaining the list of updated files operates through an application programming interface.

Aspect 21. The computer readable medium of any of Aspects 15 to 20, wherein the processor is configured to execute the computer readable medium and cause the processor to: perform data leak prevention using the fingerprints.

What is claimed is:

1. A method of automatically selective updating a data fingerprint on a plurality of proxy datacenters, the method comprising:

generating, through a cloud connector, fingerprints of a stored set of data on a cloud drive;

transmitting, from the cloud connector, the fingerprints to a cloud storage for later retrieval by a plurality of proxy datacenters;

periodically automatically obtaining, through the cloud connector, a list of updated files stored on the cloud drive;

automatically running, on the cloud connector, a finger-printer on the list of updated files that generates supplemental fingerprints for the updated files;

transmitting, from the cloud connector, the supplemental fingerprints to the cloud storage for later retrieval by the plurality of proxy datacenters; and performing data leak prevention using the fingerprints and supplemental fingerprints.

2. The method of claim 1, wherein the list of updated files includes files that were included on the stored set of data and subsequently modified.

3. The method of claim 1, wherein the list of updated files includes additional files that were not previously on the stored set of data.

4. The method of claim 1, further comprising: instructing the plurality of proxy datacenters to retrieve the fingerprints and the supplemental fingerprints from the cloud storage at predetermined intervals.

5. The method of claim 4, further comprising: determining that one or more files on the cloud drive have been deleted and transmitting a request to remove a corresponding fingerprint from the cloud storage and the plurality of proxy datacenters.

6. The method of claim 1, wherein the periodically automatically obtaining the list of updated files operates through an application programming interface.

7. The method of claim 1, wherein the plurality of proxy datacenters provide managed network access by obfuscating an original IP address.

8. A system comprising:

a storage configured to store instructions; and a processor configured to execute the instructions and cause the processor to:

generate fingerprints of a stored set of data on a cloud drive;

transmit the fingerprints to a cloud storage for later retrieval by a plurality of proxy datacenters;

obtain, periodically and automatically, a list of updated files stored on the cloud drive;

run automatically a fingerprinter on the list of updated files that generates supplemental fingerprints for the updated files;

transmit the supplemental fingerprints to the cloud storage for later retrieval by the plurality of proxy datacenters; and perform data leak prevention using the fingerprints and supplemental fingerprints.

9. The system of claim 8, wherein the list of updated files includes files that were included on the stored set of data and subsequently modified.

10. The system of claim 8, wherein the list of updated files includes additional files that were not previously on the stored set of data.

11. The system of claim 8, wherein the processor is configured to execute the instructions and cause the processor to: instruct the plurality of proxy datacenters to retrieve the fingerprints and the supplemental fingerprints from the cloud storage at predetermined intervals.

12. The system of claim 11, wherein the processor is further configured to determine that one or more files on the cloud drive have been deleted and transmit a request to remove a corresponding fingerprint from the cloud storage and the plurality of proxy datacenters.

13. The system of claim 8, wherein the periodically automatically obtaining the list of updated files operates through an application programming interface.

14. The system of claim 8, wherein the plurality of proxy datacenters provide managed network access by obfuscating an original IP address.

15. A non-transitory computer readable medium comprising instructions, the instructions, when executed by a computing system, cause the computing system to:

generate fingerprints of a stored set of data on a cloud drive;

transmit the fingerprints to a cloud storage for later retrieval by a plurality of proxy datacenters;

obtain, periodically and automatically, a list of updated files stored on the cloud drive;

run automatically a fingerprinter on the list of updated files that generates supplemental fingerprints for the updated files; and transmit the supplemental fingerprints to the cloud storage for later retrieval by the plurality of proxy datacenters; and perform data leak prevention using the fingerprints and supplemental fingerprints.

16. The computer readable medium of claim 15, the list of updated files includes files that were included on the stored set of data and subsequently modified.

17. The computer readable medium of claim 15, the list of updated files includes additional files that were not previously on the stored set of data.

18. The computer readable medium of claim 15, wherein the computer readable medium further comprises instructions that, when executed by the computing system, cause the computing system to: instruct the plurality of proxy datacenters to retrieve the fingerprints and the supplemental fingerprints from the cloud storage.

19. The computer readable medium of claim 15, the periodically automatically obtaining the list of updated files operates through an application programming interface.

* * * * *